US011914714B2

(12) United States Patent
Nomura (10) Patent No.: US 11,914,714 B2
(45) Date of Patent: Feb. 27, 2024

(54) INFORMATION PROCESSING APPARATUS AND START-UP METHOD OF THE SAME

(71) Applicant: Canon Kabushiki Kaisha, Tokyo (JP)

(72) Inventor: Yoshihisa Nomura, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 602 days.

(21) Appl. No.: 17/159,349

(22) Filed: Jan. 27, 2021

(65) Prior Publication Data

US 2021/0232690 A1    Jul. 29, 2021

(30) Foreign Application Priority Data

Jan. 29, 2020   (JP) ................................ 2020-012890

(51) Int. Cl.
*G06F 21/57* (2013.01)
*H04L 9/30* (2006.01)
*H04N 1/00* (2006.01)
*H04L 9/32* (2006.01)

(52) U.S. Cl.
CPC .............. *G06F 21/572* (2013.01); *H04L 9/30* (2013.01); *H04L 9/3236* (2013.01); *H04N 1/00938* (2013.01); *G06F 2221/033* (2013.01); *H04L 9/3247* (2013.01); *H04N 2201/0094* (2013.01)

(58) Field of Classification Search
CPC ... G06F 21/572; G06F 2221/033; H04L 9/30; H04L 9/3236; H04L 9/3247; H04N 1/00938; H04N 2201/0094
See application file for complete search history.

(56) References Cited

U.S. PATENT DOCUMENTS

| 2008/0086628 A1* | 4/2008 | Rodgers ................ G06F 21/572 713/1 |
| 2011/0044451 A1 | 2/2011 | Anzai et al. |
| 2019/0114429 A1* | 4/2019 | Shimizu ................ G06F 21/572 |
| 2020/0311279 A1* | 10/2020 | Goda .................... G06F 21/575 |

FOREIGN PATENT DOCUMENTS

WO    2009013825 A1    9/2010

* cited by examiner

*Primary Examiner* — Terrell S Johnson
(74) *Attorney, Agent, or Firm* — Venable LLP (57) ABSTRACT

An information processing apparatus includes a first CPU, a second CPU, a first nonvolatile memory that stores a boot program to be executed by the first CPU at a time of start-up, and a second nonvolatile memory that stores a first boot program and a second boot program for verifying a program. The first CPU determines whether or not a verification method is set in the first nonvolatile memory, and if not, the first CPU executes the first boot program, and writes the setting of the verification method to the second nonvolatile memory. If the verification method is set, the first CPU executes the second boot program in accordance with the setting, and when the processing of the second boot program is normally ended, the second CPU starts up the information processing apparatus.

13 Claims, 9 Drawing Sheets

INFORMATION PROCESSING APPARATUS AND START-UP METHOD OF THE SAME

BACKGROUND OF THE INVENTION

Field of the Invention

The present invention relates to an information processing apparatus and a start-up method of the same.

Description of the Related Art

Attacks on computers that make use of the vulnerability of software and altering the software have become a problem.

An information processing apparatus including a first CPU, a second CPU, and a nonvolatile memory for storing a program to be executed by the second CPU is described in International Publication No. 2009/013825. In this information processing apparatus, the first CPU reads out a program to be executed by the second CPU from the nonvolatile memory, verifies whether or not the program has been altered, and outputs the program to the second CPU according to the verification result. In this way, the second CPU executes a program that has not been altered, and as a result, the security can be improved.

In a system in which a program is read out from an external memory, and whether the program has been altered is verified, verification that the program itself has not been altered is performed. However, if the contents of the external memory are altered in a state in which the setting is configured such that alteration is not to be detected, the alteration cannot be detected, and therefore there is a problem in that the program that has been altered is allowed to be executed. Therefore, a start-up program that is the base of security, and security settings regarding a public key for encryption, an encryption method, and the like that are used by the program need to be stored in a storage apparatus that has durability. This is because if the start-up program that is the base of security has vulnerability in security, the security of the entire system cannot be ensured. Therefore, these are stored in a storage apparatus such as a ROM that cannot be re-written, in general.

On the other hand, it is desirable to adopt a configuration in which the security settings regarding the public key and the encryption method can be changed in accordance with the shipment destination and application of a product. Therefore, there are cases where such settings are stored in a storage apparatus called an OTP-ROM (One Time Programmable ROM) that can be re-written only once. In such a case, the security settings regarding the public key and the encryption method need to be written into the OTP-ROM. Therefore, a program that can be read by the boot program and operate in an initial state of the OTP-ROM needs to be prepared in the OTP-ROM, for example. Writing of such a program to an OTP-ROM takes a long time, and this is a problem in terms of a manufacturing cost as well.

SUMMARY OF THE INVENTION

An aspect of the present invention is to eliminate the above-mentioned problem with conventional technology.

A feature of the present invention is to provide a technique for reducing the amount of a program to be stored in a nonvolatile memory that stores a boot program by starting up a program for configuring a setting regarding verification of a program, when the apparatus is a new component.

According to a first aspect of the present invention, there is provided an information processing apparatus comprising: a first CPU; a second CPU; a first nonvolatile memory that stores a boot program to be executed by the first CPU at a time of start-up; and a second nonvolatile memory that stores a first boot program and a second boot program for verifying a program, wherein the first CPU determines whether or not a verification method indicating encryption is set in the first nonvolatile memory as a setting for verifying alteration of a program, and if the verification method has not been set, executes the first boot program, and writes the setting of the verification method to the second nonvolatile memory, and if the verification method is set, the first CPU executes the second boot program in accordance with the setting, and when the processing of the second boot program is normally ended, the second CPU starts up the information processing apparatus.

According to a second aspect of the present invention, there is provided a start-up method of an information processing apparatus including a first CPU, a second CPU, a first nonvolatile memory that stores a boot program to be executed by the first CPU, and a second nonvolatile memory that stores a first boot program and a second boot program for verifying a program, the start-up method comprising: the first CPU executing the boot program stored in the first nonvolatile memory by, at a time of start-up, wherein the first CPU determines whether or not a verification method indicating encryption is set in the first nonvolatile memory as a setting for verifying alteration of a program, if the verification method has not been set, the first CPU executes the first boot program, and writes the setting of the verification method to the first nonvolatile memory, when the setting of the verification method is written into the first nonvolatile memory, the first CPU restarts the information processing apparatus, if the verification method has been set, the first CPU executes the second boot program in accordance with the setting, and if the processing performed by the second boot program is normally ended, the second CPU starts up the information processing apparatus.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Also, a plurality of features may be arbitrarily combined.

Note that an MFP (digital MFP/Multi Function Peripheral) will be described as the information processing apparatus according to the embodiment, as an example. However, the application range is not limited to the MFP, and the apparatus needs only be an information processing apparatus. In the following embodiment, a method in which alteration detection setting processing and alteration detection processing are to be executed in the start-up sequence in an isolated manner will be described.

Figure 1:
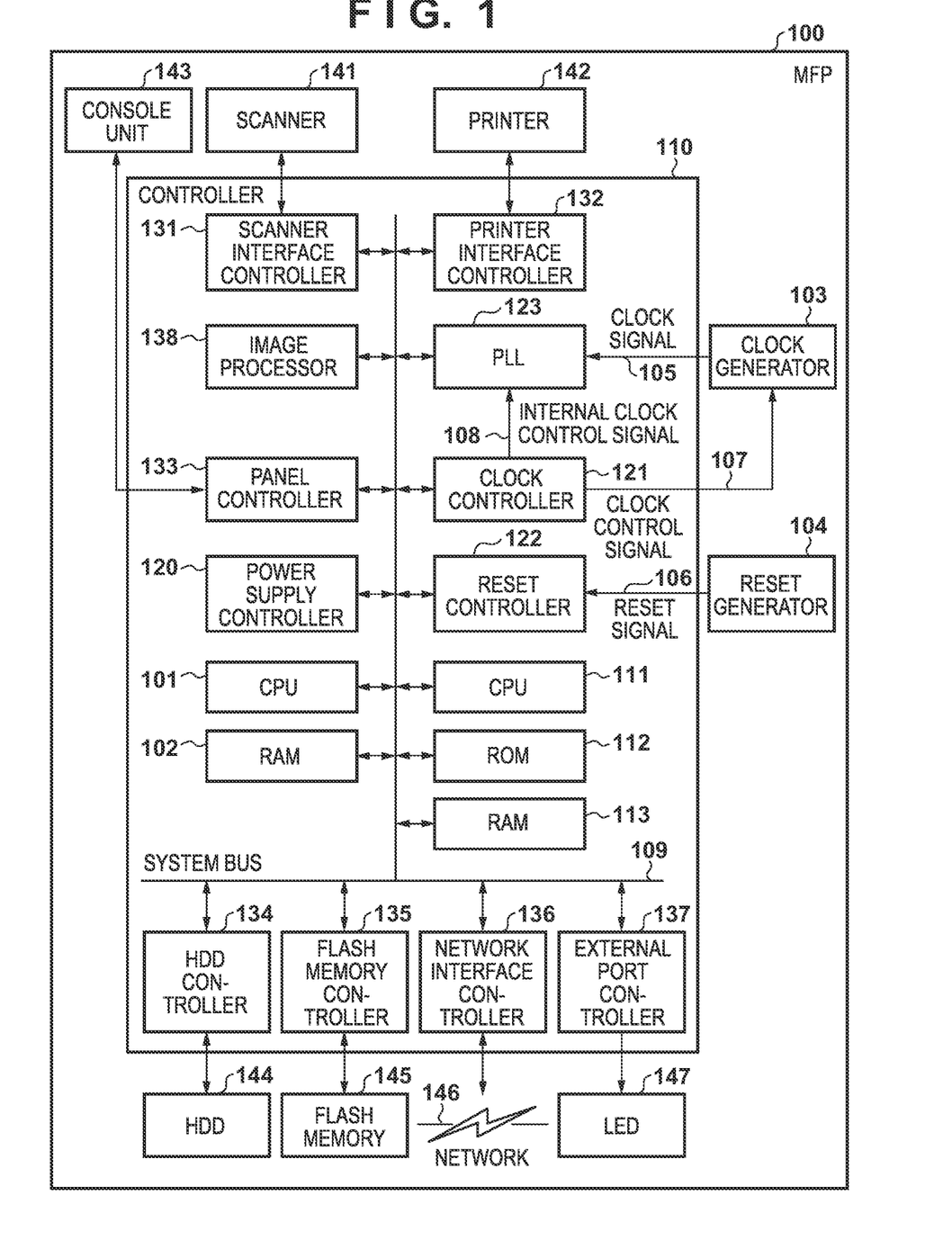
FIG. 1 is a block diagram for describing a hardware configuration of an MFP according to an embodiment of the present invention.

FIG. 1 is a block diagram for describing a hardware configuration of an MFP 100 according to the embodiment of the present invention.

A controller 110 includes a hardware module for controlling the MFP 100. In the embodiment, a description will be given assuming that the controller 110 is configured as a semiconductor chip. A clock generator 103 generates a clock signal and supplies the clock signal (external clock) with a frequency suitable to the modules of the MFP 100. In the embodiment, the clock generator 103 supplies a clock signal 105 to a PLL (Phase Locked Loop) 123 in the controller 110. Note that the frequency of this clock signal 105 can be changed by a clock control signal 107.

A clock controller 121 controls the PLL 123 with an internal clock control signal 108. With this, the PLL 123 multiplies the frequency of the clock signal 105 and supplies a clock signal whose frequency has been multiplied to the modules of the controller 110. The clock controller 121 performs control such that the PLL 123 supplies a clock signal (internal clock signal) with a frequency optimum to the modules by changing the setting of the PLL 123 regarding multiplication, when the controller 110 is started up or in operation. Also, the clock controller 121 can stop supplying of the clock signal to the modules by performing gating regarding the clock signal.

A reset generator 104 is a semiconductor chip that resets the modules of the MFP 100 or releases the reset by generating and outputting a reset signal 106. Although only the reset signal 106 to be supplied to the controller 110 is illustrated in FIG. 1, the reset signal is supplied to modules such as a flash memory 145, an LED 147, a scanner 141, and a printer 142 as well.

When the power supply to the MFP 100 is turned on, the reset signal 106 is kept in a reset state for a fixed time (e.g., until the power supply voltage to be supplied stabilizes), and thereafter the reset of the controller 110 is released by causing the reset signal 106 to enter a released state. The state in which the reset signal 106 is asserted is the reset state, and the state in which the reset signal 106 is negated is the released state of the reset signal 106. When the reset of the controller 110 is released, a reset controller 122 performs reset control on the modules in the controller 110. This reset control indicates the control for causing each module to enter a reset state or a reset released state when the controller 110 is started up or in operation.

The CPU 101 performs overall control on the entirety of the MFP 100 by executing a software program of the MFP 100. A RAM 102 is a volatile random access memory that is used for storing a program and temporary data when the CPU 101 controls the MFP 100. An HDD 144 is a hard disk drive, and it stores some applications and various types of data. This HDD 144 stores a Java (registered trademark) program 214 (FIG. 2) to be executed by the CPU 101. Note that the Java program 214 will be described later (the same applies to a BIOS 210 and the like, in the following). The flash memory 145 stores fixed parameters of the MFP 100 and the like. Also, the flash memory 145 stores the BIOS 210 (FIG. 2) to be executed by the CPU 101. Moreover, the flash memory 145 stores a loader 211, a kernel 212, and a Native program 213 (all shown in FIG. 2) that are to be executed by the CPU 101. Note that the HDD 144 and the flash memory 145 may be a same storage module.

A CPU 111 executes an alteration detection software program for detecting alteration of a software program to be executed by the CPU 101, and in addition, performs some control on the MFP 100 in a sharing manner with the CPU 101. A ROM 112 is a nonvolatile read only memory, and it stores an alteration detection software program to be executed by the CPU 111, a later-described public key, and the like. Also, the ROM 112 stores a boot program 209 (FIG. 2) to be executed by the CPU 111. Here, the ROM 112 is constituted by a mask ROM constituted by logic circuits or an OTP-ROM (One Time Programmable ROM) to which writing is possible only once at the time of manufacturing, such that rewriting is not possible from an external interface. A RAM 113 is a volatile random access memory, and is used for storing a program, temporary data, and the like, when the CPU 111 controls the MFP 100. Note that the RAM 102 and the RAM 113 may be a same module.

A power supply controller 120 is an IC (Integrated Circuit) that controls the power supply to the modules of the controller 110. The power supply controller 120 can supply predetermined power or stop the supply of power to the modules when the controller 110 (MFP 100) is started up or in operation. A scanner interface controller 131 controls reading of a document performed by a scanner 141. A printer interface controller 132 controls printing processing performed by a printer 142 and the like. A panel controller 133 controls a touch panel-type console unit 143, displays various types of information, and accepts inputs of instructions from a user. An HDD controller 134 performs control regarding reading/writing data from/to the HDD 144. For example, image data stored in the RAM 102 can be stored in the HDD 144 via a system bus 109. A flash memory controller 135 performs control regarding reading/writing data from/to the flash memory 145. The flash memory controller 135 reads out a program stored in the flash memory 145 and deploys the program in the RAM 113 via the system bus 109. A network interface controller 136 controls transmission/reception of data to/from another device or server on a network 146. An external port controller 137 is an input/output port controller of the controller 110. For example, information regarding an anomaly in software or hardware can be communicated to the outside by lighting the LED 147 as needed by controlling the output port. An image processor 138 is a processor that performs shading correction on image data that is obtained by the scanner 141 reading a document, and it performs halftone processing and smoothing processing for outputting the image data to the printer 142. The system bus 109 connects the modules to each other. Control signals from the CPU 101 and the CPU 111 and data signals between the units are transmitted and received via this system bus 109.

Figure 2:
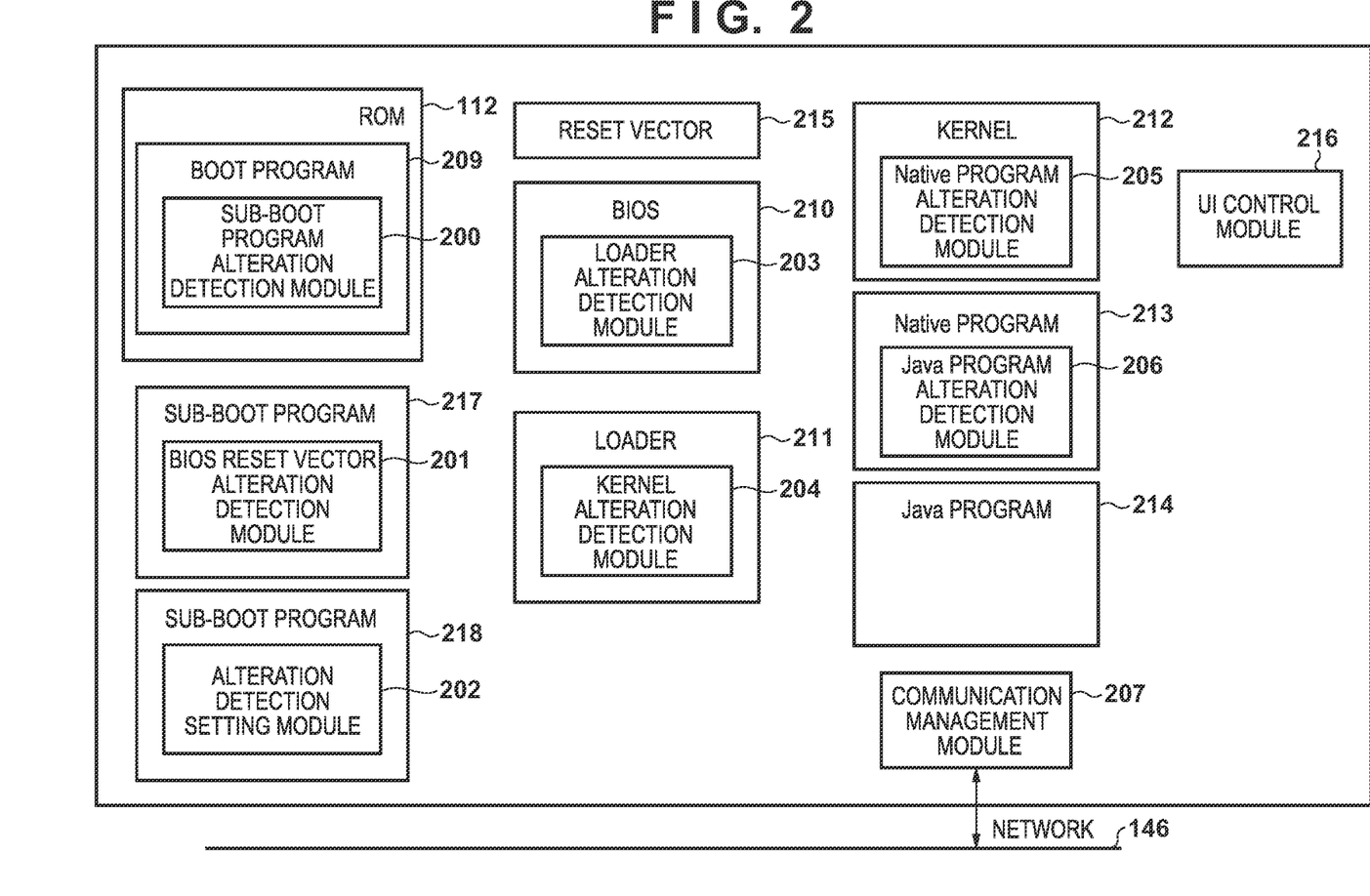
FIG. 2 is a block diagram for describing a software module included in the MFP according to the embodiment.

FIG. 2 is a block diagram for describing software modules included in the MFP 100 according to the embodiment. A description will be given assuming that these pieces of software are executed by the CPU 101 or CPU 111.

A communication management module 207 transmits and receives data to and from external devices via the network 146 by controlling the network interface controller 136 to be connected to the network 146. A UI control module 216 receives an input from the console unit 143 via the panel controller 133, and it performs processing in accordance with the input and outputting of a screen to the console unit 143.

A boot program 209 is stored in the ROM 112, and it is a program to be executed by the CPU 111 when the power supply of the MFP 100 is turned on. The boot program 209 executes a start-up sequence of the controller 110 as processing related to the start up. This start-up sequence will be described later with reference to FIGS. 5 and 6. This boot program 209 includes a sub-boot program alteration detection module 200 for performing alteration detection on sub-boot programs 217 and 218. Note that, all of the programs other than the boot program 209 in FIG. 2 are stored in the flash memory 145.

The sub-boot program 217 executes a BIOS reset vector alteration detection module 201 for detecting an alteration regarding the BIOS 210. Alternatively, the sub-boot program 217 executes an alteration detection setting module 202, and it executes a later-described alteration detection setting program to be performed on the ROM 112.

The BIOS 210 is a program that is executed by the CPU 101 after the boot program 209 having been executed, and, in addition to performing processing relating to start up, includes a loader alteration detection module 203 for performing alteration detection on the loader 211. Moreover, the sub-boot program 218 includes an alteration detection setting module 202 for performing setting on the ROM 112 for performing alteration detection on the loader 211.

The loader 211 is a program to be executed by the CPU 101 after the processing of the BIOS 210 is ended, and, in addition to performing processing relating to start up, includes a kernel alteration detection module 204 for performing alteration detection on the kernel 212.

The kernel 212 is a program to be executed by the CPU 101 after the processing of the loader 211 is ended, and, in addition to performing processing relating to start up, includes a Native program alteration detection module 205 for performing alteration detection on the Native program 213.

A reset vector 215 is a program in which information regarding processing that is to be executed first when the reset of the CPU 101 is released is stated. Addresses of an exception handler and an ISR (interruption service routine) are stated in the reset vector 215. As a result of stating a jump destination address, the handler automatically shifts to the address, and the CPU 101 can execute a program starting from this address. When the reset is released, a reset handler that is one of exception handlers is referred to, and a program starting from the jump destination address stated in the reset handler is executed. Note that, depending on the CPU, a method is also present in which a command is stated, and a shift is performed to a designated address by executing the command. In the embodiment, a description will be given assuming the former method.

The Native program 213 is a program to be executed by the CPU 101, and it is constituted by a plurality of programs that provide functions in cooperation with the Java program 214 of the MFP 100. This plurality of programs includes programs for controlling the scanner interface controller 131 and the printer interface controller 132, start-up programs of these controllers, and a restart program of the CPU 111, for example. These start-up programs and the restart program of the CPU 111 are called by the kernel 212 from the Native program, and they perform start-up processing. Here, the restart program of the CPU 111 is for using the CPU 111 for another application after the CPU 111 has executed the boot program and completed the BIOS reset vector alteration detection processing. For example, the restart program is used as a program for monitoring an interruption to an external port when being in a power saving mode. Here, the power saving mode indicates a state in which the power supply is safely cut off or clock signals are stopped, from a normal operating state, regarding controllers and processors other than the CPU 111, the external port controller, the system bus 109, the network interface controller 136, and the console unit 143. When the external port controller 137 detects an interruption to the external port by receiving a signal from a sensor, for example, the CPU 111 performs processing for returning from the power saving mode to the normal mode. The aforementioned controllers and processors regarding which the power supply is cut off or the clock signals are stopped are safely shifted to the operating state. As a result of the CPU 111 performing interruption monitoring, when the scale and standby power of the CPU 111 are smaller than those of the CPU 101, it is possible to improve the efficiency of power saving by cutting off the power supply or stopping the clock signal regarding the CPU 101 that performs processing in a normal operating state. Also, the Native program 213 includes a Java program alteration detection module 206 for performing alteration detection on the Java program, as one of the programs.

The Java program 214 is a program to be executed by the CPU 101, and it is a program for providing functions in cooperation with the Native program 213 of the MFP 100 (a program for displaying a screen in the console unit 143, for example).

Next, the start-up sequence of the MFP 100 will be described with reference to FIGS. 3A to 3C.

Figure 3A:
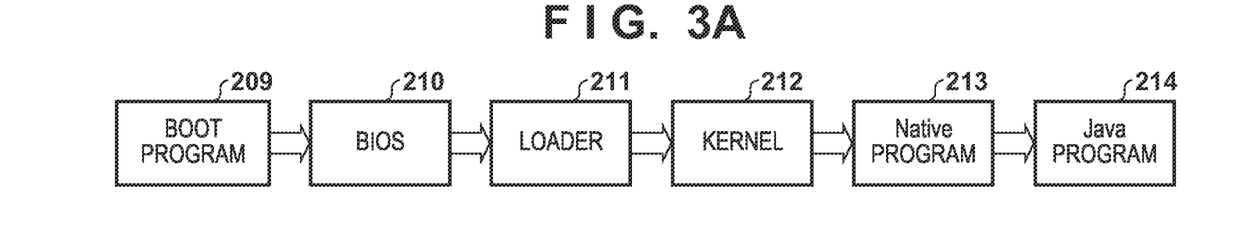
FIGS. 3A to 3C are diagrams for describing a start-up sequence in the MFP according to embodiment.
Figure 3B:
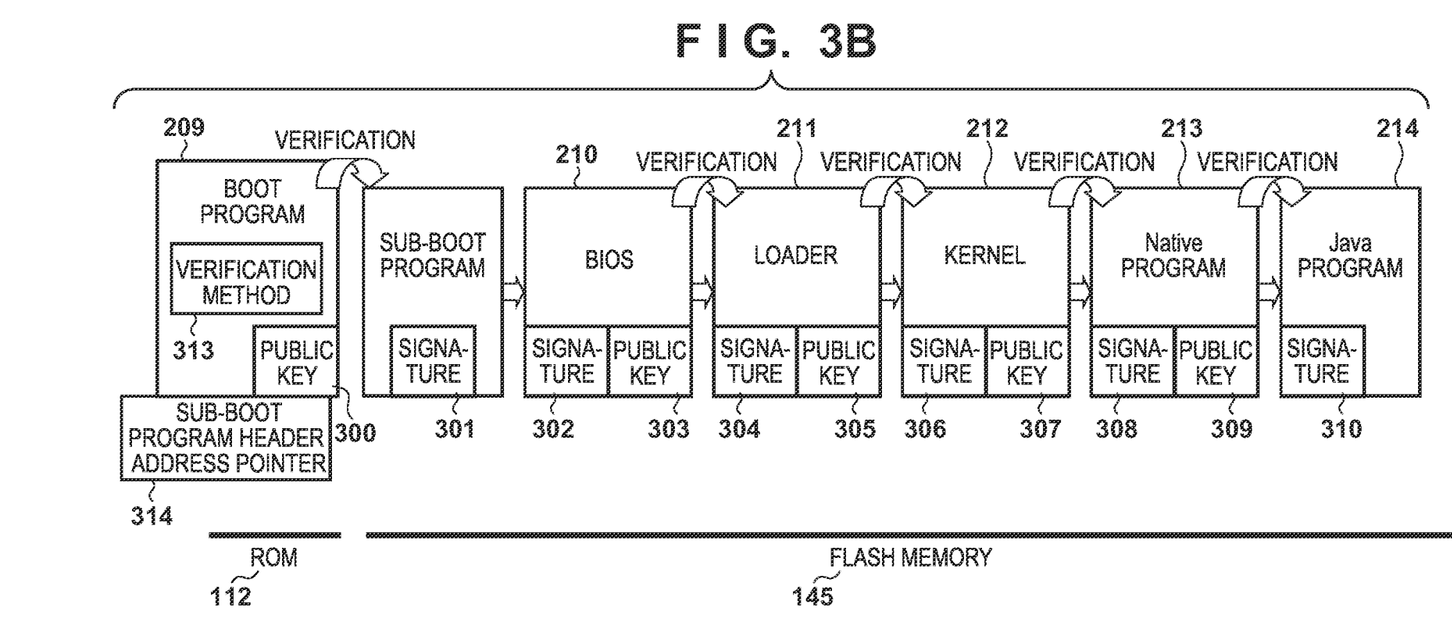
Figure 3C:
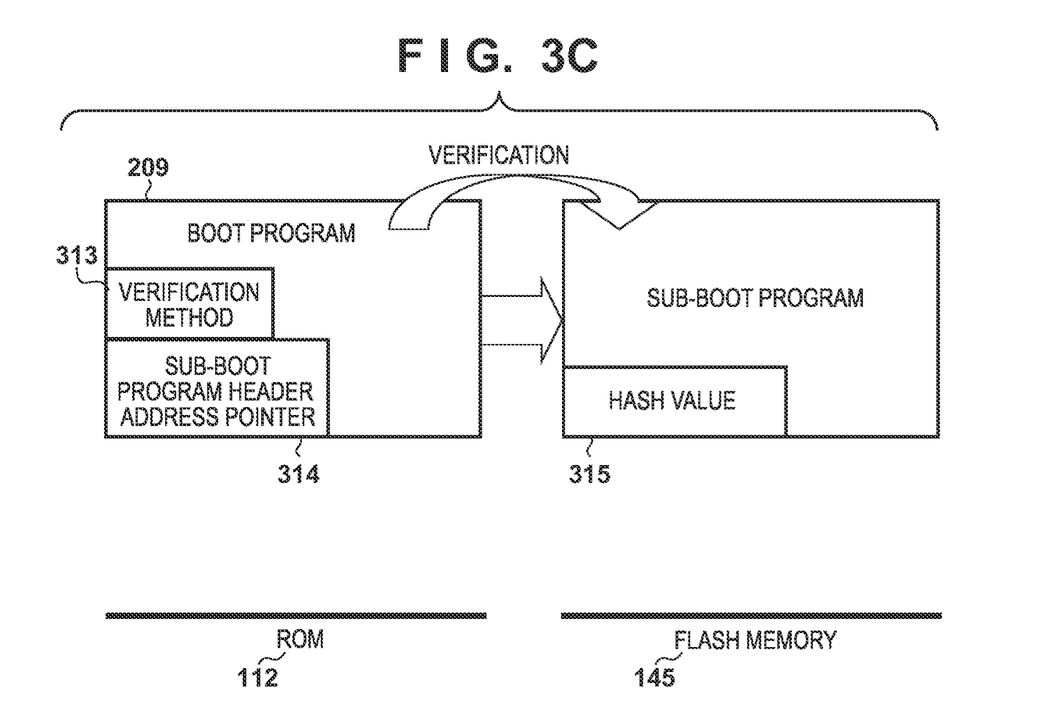

FIGS. 3A to 3C are diagrams for describing the start-up sequence in the MFP 100 according to the embodiment.

FIG. 3A is a diagram schematically illustrating the start-up sequence indicating the order that the MFP 100 starts up without performing alteration detection on a program.

The CPU 111 executes the boot program 209 and releases the reset of the CPU 101. With this, when the CPU 101 starts up the BIOS 210, the BIOS 210 starts up the loader 211, and the loader 211 starts up the kernel 212. Moreover, the kernel 212 starts up the start-up program from the Native program 213. In this way, the Java program 214 is started up from the start-up program, and hereinafter, the Native program 213 and the Java program 214 cooperate, and the functions included in the MFP 100 can be provided.

FIGS. 3B and 3C are schematic diagrams of the start-up sequence according to the embodiment. FIGS. 3B and 3C are also schematic diagrams showing saving locations of the respective programs, saving locations of digital signatures (hereinafter, called as signatures) and public keys, a verification method, a sub-boot program header address pointer, and a hash value.

Here, the signature is obtained by converting an authorized program (data stream) to a hash value using a predetermined hash function and encrypting the hash value by a private key corresponding to a public key, for example. The hash value of the authorized program is calculated by decoding the encrypted hash value with the public key, the program regarding which whether or not it has been altered is to be verified is converted to a hash value using the aforementioned hash function, and these two hash values are compared. If these two hash values are the same, it can be determined that the program to be verified has not been altered from the authorized program. Also, if these two hash values are different from each other, it can be determined that the program to be verified has been altered from the authorized program. The method for checking whether or not the program to be verified been altered using the signature, in this way, will be called as signature verification in the following. Also, the fact that the program has not been altered is called as being successful in the signature verification, and the fact that the program has been altered is called as being failed in the signature verification. Also, in the signature verification, the hash value of a program is encrypted, but it is possible that whether or not a program has been altered can be determined by comparing only the hash values of the program without the hash values being encrypted. The method for checking whether or not the program to be verified has been altered using the hash value, in this way, will be called as hash verification in the following.

The value of a verification method 313 is a setting value that is used by the CPU 111 in order to switch between the signature verification and the hash verification when the CPU 111 executes the boot program 209, and it is stored in the ROM 112. Note that, in the embodiment, the value of the verification method in the ROM 112 being "0" indicates the hash verification, and "1" indicates the signature verification.

Figure 4A:
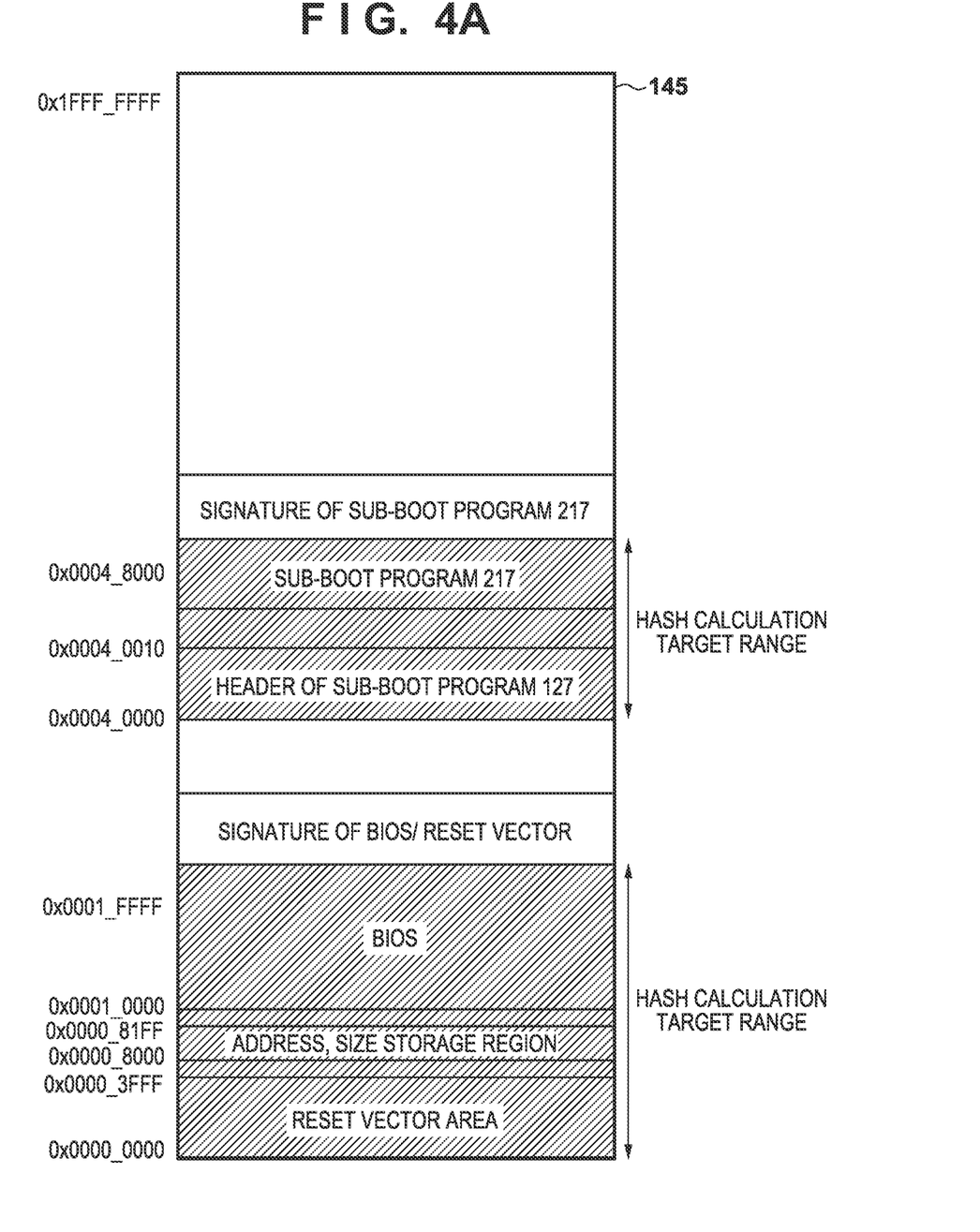
FIG. 4A is a configuration diagram of a flash memory regarding a sub-boot program 217 and its signature, BIOS, a reset vector and its signature, in the MFP according to the embodiment.
Figure 4B:
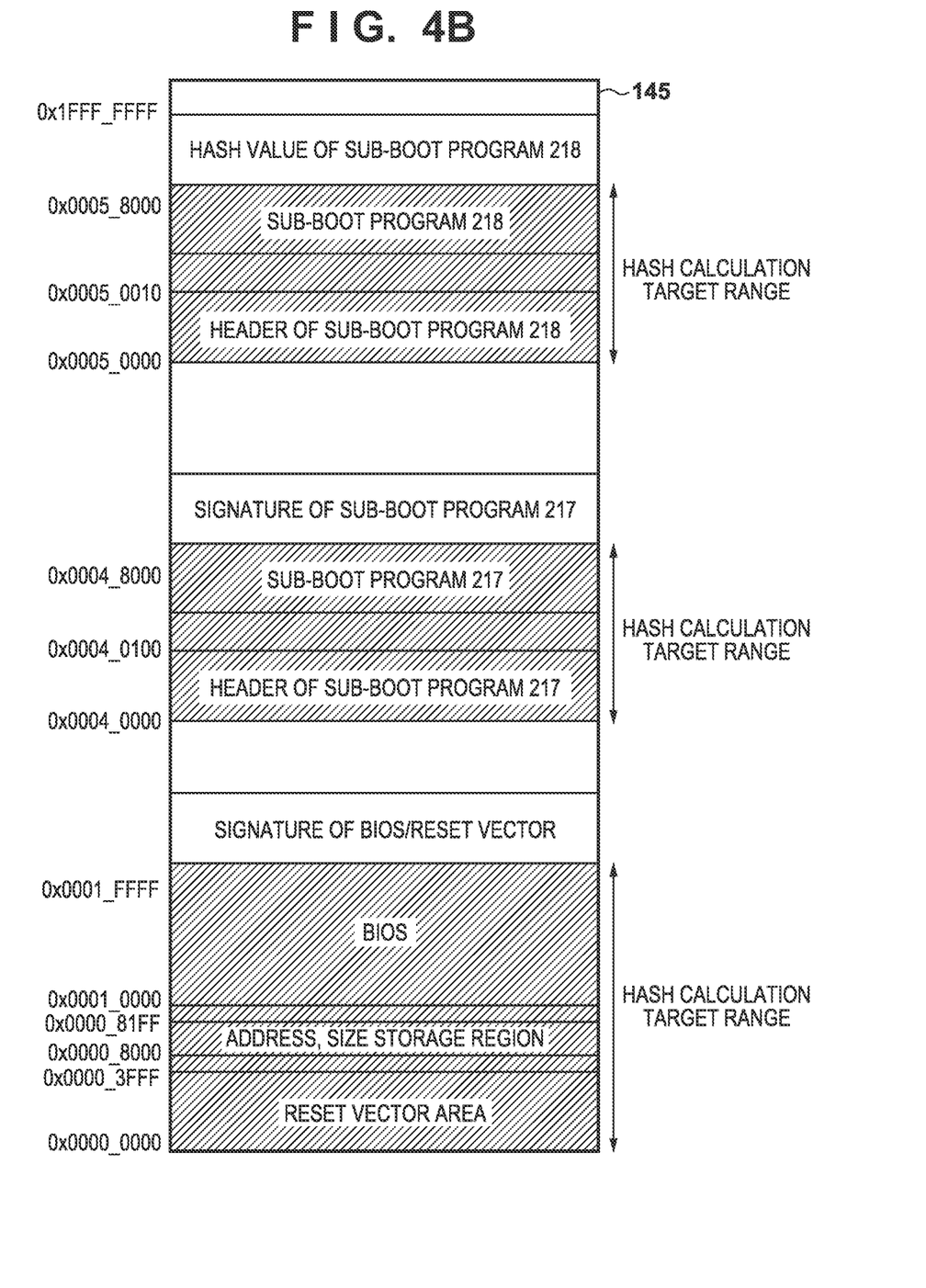
FIG. 4B is a configuration diagram in which a sub-boot program 218 and its hash value are added to the configuration in FIG. 4A.

A sub-boot program header address pointer 314 indicates the location of the sub-boot program header address in the boot program 209. In the embodiment, which of the BIOS reset vector alteration detection module 201 and the alteration detection setting module 202 is caused to operate by the CPU 111 is determined by the sub-boot program indicated by a header obtained by referring to the address pointer. Note that, in the embodiment, when the setting of the sub-boot program header address pointer 314 is not performed in the ROM 112, the value of the address pointer of the ROM 112 is "0". In this case, a predetermined address on the flash memory 145 is referred to. On the other hand, when the setting of the sub-boot program header address pointer 314 is performed, the program is executed by referring to the address. The contents to be referred to will be described later with reference to FIG. 4.

Note that, in the embodiment, the method using the signature and the public key, and the method of using the hash value are adopted as the method for checking whether or not a program has suffered from alteration, but another method for checking whether or not suffering from alteration may be used.

FIG. 3B is a schematic diagram of the start-up sequence in which the boot program 209, the sub-boot program 217, the BIOS 210 and the reset vector 215, the loader 211, the kernel 212, the Native program 213, and the Java program 214 start up in this order while performing the alteration detection.

The boot program 209 includes a public key 300 for verifying the sub-boot program signature and the BIOS signature. The sub-boot program includes its signature 301. The BIOS 210 includes a BIOS reset vector signature 302 and a loader verification public key 303. Also, the loader 211 includes a loader signature 304 and a kernel verification public key 305. Also, the kernel 212 includes a kernel signature 306 and a Native program verification public key 307. Also, the Native program 213 includes a Native program signature 308 and a Java program verification public key 309. Moreover, the Java program 214 includes a Java program signature 310. These public keys and signatures are given to the programs before shipping the MFP 100.

FIG. 3C is a schematic diagram of the start-up sequence that shows an execution flow of the alteration detection setting processing of the sub-boot program from the boot program 209. Here, its hash value 315 is added to the sub-boot program in the flash memory 145.

FIG. 4A is a configuration diagram of the sub-boot program 217 and its signature 301, the BIOS 210, and the reset vector 215 and its signature 302 that are on the flash memory 145.

Here, a case where the sub-boot program header address pointer 314 in FIG. 3C is set to "0x0004_0000" is illustrated. Here, a value obtained by converting the data stream from the header of the sub-boot program 217 until the end of the sub-boot program 217 to a hash value, and encrypting the hash value with a private key corresponding to the public key is stored in a signature area of the sub-boot program 217. Then, the hash value of the authorized program and the reset vector 215 is calculated by decoding this hash value with the public key, a program to be verified whether or not suffering from alteration is converted to a hash value by the aforementioned hash function, and these two hash values are compared. The address and the size of the sub-boot program 217 is stored in a hash calculation target range "0x0004_0000" to "0x0004_0010" as the header of the sub-boot program 217. Also, the CPU 111 executes the boot program 209, reads the address and the size, and converts the data stream in a necessary area to the hash value. In the flash memory 145, the signature or the hash value is arranged next to the sub-boot program 217, but the configuration may be such that the address and the size of the signature or the hash value are added to the header of the sub-boot program 217, and the boot program 209 reads and refers to the address and the size.

The BIOS reset vector alteration detection module 201, the loader alteration detection module 203, the kernel alteration detection module 204, the Native program alteration detection module 205, and the Java program alteration detection module 206 described above respectively verify whether or not suffering from alteration regarding the subsequent program. Also, if a program has not been altered, the program is started up. In this way, the MFP 100 is started up following the start-up sequence in which verification as to whether or not a program is altered and starting up the program are sequentially executed.

FIG. 4B is a configuration diagram in which the sub-boot program 218 and its hash value are added, on the flash memory 145, to the configuration in FIG. 4A.

Here, an alteration detection setting is not performed on the sub-boot program 218, and therefore the hash value verification is used instead of the signature verification. A configuration is shown in which when the sub-boot program header address pointer 314 is not set in FIG. 3C, the boot program 209 reads "0x0005_0000". Here, a value obtained by converting the data stream from the header of the sub-boot program 218 until the end of the sub-boot program 218 to a hash value is stored in the hash value area of the sub-boot program 218. Also, the program to be verified whether or not suffering from alteration is converted to a hash value using the aforementioned hash function, and these two hash values are compared. The address and the size of the sub-boot program 218 are stored in a hash calculation target range "0x0005_0000" to "0x0005_0010" as the header of the sub-boot program 218. Also, the CPU 111 executes the boot program 209, reads the address and the size, and converts the data stream in a necessary area to the hash value. In the flash memory 145, the hash value is arranged next to the sub-boot program 218, but the configuration may be such that the address and the size of the hash value are added to the header of the sub-boot program 218, and the boot program 209 reads and refers to the address and the size.

Next, a method in which the alteration detection setting processing and the alteration detection processing are to be executed in the start-up sequence in an isolated manner, which is the feature of the embodiment, will be described with reference to the flowchart in FIGS. 5 to 7.

Figure 5:
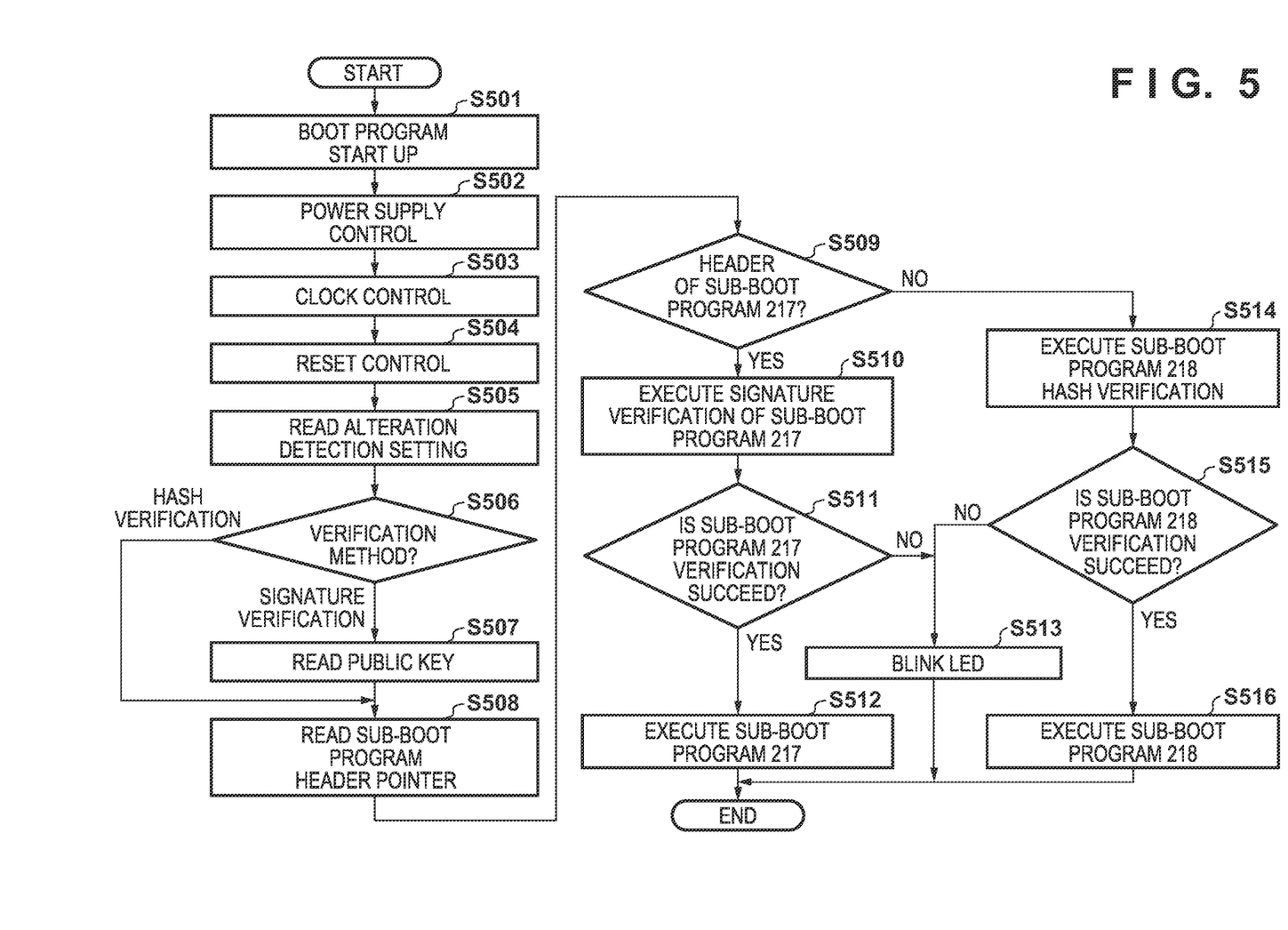
FIG. 5 is a flowchart for describing start-up sequence processing to be executed by a CPU 111 of the MFP according to the embodiment.

FIG. 5 is a flowchart for describing the start-up sequence processing to be executed by the CPU 111 of the MFP 100 according to the embodiment. Note that, in the embodiment, the processing in the flowchart in FIG. 5 is to be executed after having been operated in a setting described below, in the initial state.

When the power supply of the MFP 100 is turned on, the power supply controller 120 performs control so as to supply power to the units of the controller 110. The clock controller 121, upon receiving power performs control such that an oscillator or a resonator of the clock generator 103 is caused to generate the clock signal 105, by outputting the clock control signal 107 to the clock generator 103. Also, the clock controller 121 performs control such that the PLL 123 is caused to generate a desired internal clock signal of the controller 110, by outputting the internal clock control signal 108 to the PLL 123.

Next, the reset generator 104 releases the reset regarding the reset controller 122 through the reset signal 106. When the reset regarding the reset controller 122 is released, first, the reset controller 122 releases the reset of the system bus 109, the ROM 112, the CPU 111, the flash memory controller 135, and the flash memory 145. Note that the CPU 101 is still in the reset state at this point in time. Also, the reset vector of the CPU 111 is the address of the ROM 112. That is, when the reset of the CPU 111 is released, the CPU 111 executes the boot program 209 stored in the ROM 112. The reset vector of the CPU 101 is stored at a predetermined address ("0x0000_0000" in the embodiment) in the flash memory 145, and when the reset of the CPU 101 is released, the CPU 101 reads the reset vector. Also, the CPU 101 jumps to the address written in the reset vector and executes the BIOS 210 stored in the flash memory 145.

In the following, steps S501 to S516 show the start-up sequence to be executed by the CPU 111. That is, the following processing is performed by the software module, shown in FIG. 2, that is to be executed by the CPU 111. The feature of the start-up sequence is in step S508. That is, the sub-boot program is switched and executed by reading the header of the sub-boot program.

When this sequence is started as a result of the reset of the CPU 111 being released, first in step S501, the CPU 111 starts up and executes the boot program 209 stored in the ROM 112. Next, the processing is advanced to step S502, and the CPU 111 performs power supply control in accordance with the boot program 209. Here, the control is performed such that power is supplied to only some units in the controller 110 that are needed to perform the alteration detection or the alteration detection setting. Note that, in the embodiment, at least the following units that are needed in the alteration detection processing or the alteration detection setting are supplied with power. These units are clock controller 121, the reset controller 122, the PLL 123, the power supply controller 120, the CPU 101, the flash memory 145, the RAM 102, the CPU 111, the ROM 112, the RAM 113, the HDD controller 134, the flash memory controller 135, and the external port controller 137.

Next, the processing is advanced to step S503, and the CPU 111 performs the following clock control in accordance with the boot program 209. The operating frequency of the units in the controller 110 after the completion of starting up of the controller 110 is different according to the specification of the MFP 100. The clock controller 121 instructs the clock generator 103 to supply a desired clock signal 105 using the clock control signal 107. Note that when the frequency of the clock signal 105 is changed, a fixed time needs to be waited until the crystal resonator or the crystal oscillator stabilizes. Moreover, the clock controller 121 sets, with respect to the PLL 123, the frequency of the internal clock signal to be supplied to needed units in the controller 110 to a desired frequency using the internal clock control signal 108. In this way, the processing in the CPU 111, the system bus 109, and the flash memory controller 135 can be performed.

Note that the clock controller 121 performs the following processing in order to change the frequency of the internal clock signal. That is, the clock controller 121 once performs gating on the clock signal from the PLL 123, and switched to an external clock signal that bypasses the PLL 123. Then, after the internal clock signal generated by the PLL 123 stabilizes, control is performed so as to supply the desired internal clock signal to the units. Here, the control to switch the internal clock signal also stops the supply of the clock signal to the CPU 111, therefore the control is performed by providing a hardware sequencer inside the clock controller 121.

The clock controller 121 performs setting such that the frequency of the clock signal to be supplied to the CPU 101, the flash memory 145, the RAM 102, the CPU 111, the ROM 112, the RAM 113, the system bus 109, the HDD controller 134, and the flash memory controller 135 is a desired frequency. Note that the frequency of the clock signal to be supplied here may be changed according to the unit to be supplied.

Next, the processing is advanced to step S504, and the CPU 111 releases the reset in accordance with the boot program 209. That is, the CPU 111 releases the reset of the units needed for the alteration detection processing or the alteration detection setting. Specifically, the reset of the RAM 113, the system bus 109, and the HDD controller 134 is released. Next, the processing is advanced to step S505, and the CPU 111 reads an alteration detection setting value set in the ROM 112 in accordance with the boot program 209. Then, the processing proceeds to step S506, and the CPU 111 confirms the verification method from the alteration detection setting value. Here, if the verification method is the signature verification method, the processing proceeds to step S507, and if the verification method is the hash verification method, the processing proceeds to step S508. In the embodiment, it is assumed that the signature verification method is set when in the alteration detection processing, and the hash verification method is set when in the alteration detection setting processing. Note that the hash verification method is set in a case that a value when nothing is written in the verification method 313 (FIG. 3C) in the ROM 112.

When the signature verification method is adopted, in step S507, the CPU 111 reads the public key from the ROM 112, stores the public key to the RAM 113, and the processing proceeds to step S508. In step S508, the CPU 111 reads a value of the header pointer of the sub-boot program. Next, the processing is advanced to step S509, and the CPU 111 determines whether the value of the header pointer of the sub-boot program is a header of the sub-boot program 217 or a header of the sub-boot program 218. Here, if it is determined to be the header of the sub-boot program 217, the processing proceeds to step S510, and if not, it is determined to be the header of the sub-boot program 218, and the processing proceeds to step S514. Note that, in the embodiment, in the case of an initial value (e.g., all "0") in which nothing is written in a header address pointer of the sub-boot program in the ROM 112, the CPU 111 performs processing as in the case of reading the address (0x0005_0000 in FIG. 4B) of the sub-boot program 218.

In step S509, the CPU 111, upon determining to be the header of the sub-boot program 217, advances the processing to step S510. In step S510, if the address and the size of the sub-boot program 217 and the address of the signature are written, the CPU 111 also reads the signature from the header pointer of the sub-boot program 217. In the embodiment in FIG. 4B, an address (0x0004_0000) is set. The CPU 111 calculates the hash value of the sub-boot program 217 from the read address and size. Also, the encrypted signature is decoded to a hash value using the public key read in step S507. Then, the signature verification of the sub-boot program 217 is performed by comparing these two hash values. Then, the processing proceeds to step S511, and if the hash values match, the CPU 111 determines that the sub-boot program 217 has not suffered from alteration, and causes the processing proceeds to step S512. On the other hand, if these hash value do not match, it is determined that the sub-boot program 217 has suffered from alteration, and the processing proceeds to step S513.

In step S512, the CPU 111 loads the sub-boot program 217 to the RAM 113 and executes the sub-boot program 217. That is, alteration detection processing is performed on the BIOS reset vector. The contents of processing here will be described later with reference to the flowchart in FIG. 6A. On the other hand, in step S513, because the sub-boot program 217 has been altered, the CPU 111 causes the LED 147 to blink for performing error notification and ends this processing.

Also, in step S514, the CPU 111 obtains the address and the size of the sub-boot program 218 from a header pointer of the sub-boot program 218. Also, if the storage address of the hash value is written, the hash value is also read. In the embodiment shown in FIG. 4B, the header of the sub-boot program 218 is set to an address (0x0005_0000). Also, the CPU 111 calculates a hash value of the sub-boot program 218 from the read address and size. The hash value is compared with the stored hash value of the sub-boot program 218. Then, in step S515, if these hash values match, it is determined that the sub-boot program 218 has not suffered from alteration, and the processing proceeds to step S516, and if not, the processing proceeds to step S513 and the LED 147 is caused to blink. In step S516, the CPU 111 loads the sub-boot program 218 to the RAM 113 and executes the sub-boot program 218. That is, the alteration detection setting processing is to be executed. The contents of processing here will be described later with reference to the flowchart in FIG. 6B.

Note that, in the determination of the verification method in step S506, it is determined to be not the signature verification method, that is, in the case of the hash verification, which is the initial value, the header pointer of the sub-boot program 218 may be read, and the processing may proceed to step S514. Similarly, if the value of the public key is the initial value, in step S507, the header pointer of the sub-boot program 218 may be read, and the processing may proceed to step S514.

Next, the method of executing the alteration detection processing of the BIOS reset vector when the sub-boot program 217 is executed in step S512 in FIG. 5 will be described with reference to the flowchart in FIG. 6A.

Figure 6A:
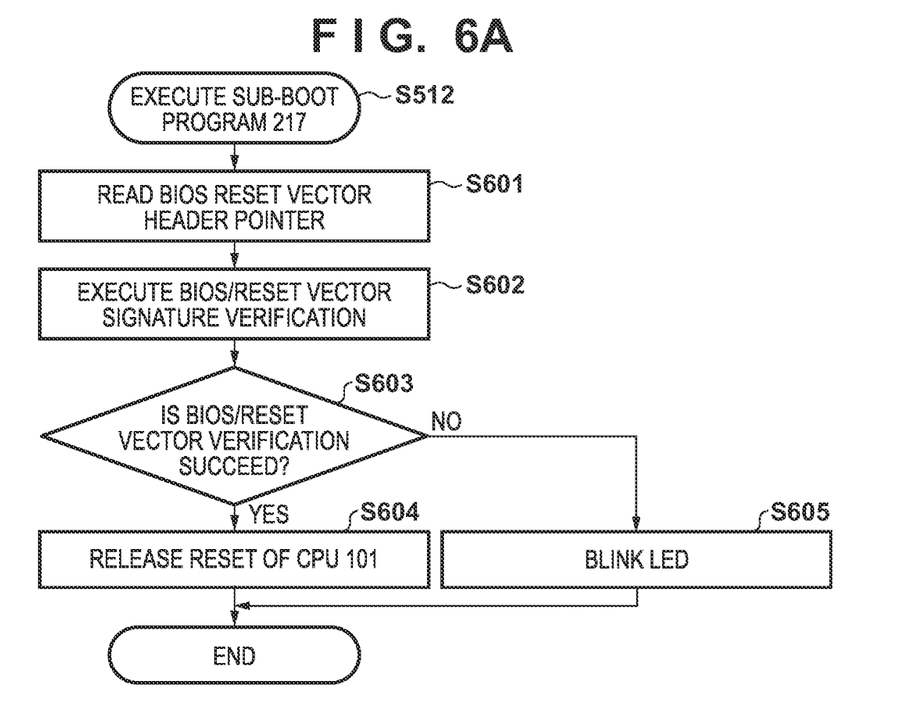
FIG. 6A is a flowchart for describing processing when a sub-boot program 217 is executed in step S512 in FIG. 5.

FIG. 6A is a flowchart for describing the processing when the sub-boot program 217 is executed in step S512 in FIG. 5.

In step S601, the CPU 111 reads a header pointer of the BIOS reset vector. In the embodiment shown in FIG. 4B, this header pointer is set to 0x0000_8000. In the embodiment, the header pointer of the BIOS reset vector is stated in the sub-boot program 217. The configuration may be such that this header pointer is included in the header of the sub-boot program 217, and the header pointer is read from the header.

Next, the processing proceeds to step S602, and the CPU 111 performs the signature verification on the BIOS and the reset vector. Here, the CPU 111 functions as the BIOS reset vector alteration detection module 201 included in the sub-boot program 217, and it reads the BIOS 210 and the reset vector 215 into the RAM 113 from the flash memory 145 through the system bus 109. In the embodiment, the data in a fixed area (hash calculation target range) from a fixed address 0x0000_0000 to a fixed address 0x0001_FFFF is read, as described in FIG. 4B. Also, the BIOS reset vector alteration detection module 201 performs verification on the BIOS reset vector signature 302 using a public key 300 for verification of the signature of the BIOS 210. Note that, in the embodiment, the verification is performed on the BIOS and the reset vector collectively, but the verification may be performed separately. Also, the addresses and the sizes of the reset vector and the BIOS may not be fixed. In such a case, the head addresses and the sizes of the reset vector and the BIOS are stored in the hash calculation target range, and are read out, as described above.

Next, the processing proceeds to step S603, and the CPU 111 determines whether or not the signature verification of the BIOS reset vector is successful. If it is determined that, as a result of the signature verification, the BIOS and the reset vector have not been altered (hash value and signature value match), the CPU 111 determines that the signature verification is successful, and the processing proceeds to step S604. On the other hand, if it is determined that the BIOS or the reset vector has been altered (hash value and signature value does not match), the CPU 111 determines that the signature verification failed, and the processing proceeds to error processing in step S605. That is, it is possible that, when the reset vector has been altered, the alteration can be detected as well, and the processing is advanced to the error processing in step S605. In step S604, the CPU 111 releases the reset of the CPU 101, the flash memory 145, and the RAM 102 by controlling the reset controller 122, and it ends the processing of the sub-boot program 217. Then the start-up sequence transitions to step S701, which will be described later. That is, the CPU 101 executes the BIOS 210 and starts up. On the other hand, if the processing proceeds to step S605, the CPU 111 functions as the BIOS reset vector alteration detection module 201, turns on the LED 147 by controlling the external port controller 137 in order to make a notification that the signature verification failed, and ends the processing of the boot program.

Next, the processing for executing the sub-boot program 218 in step S516 in FIG. 5 will be described with reference to the flowchart in FIG. 6B.

Figure 6B:
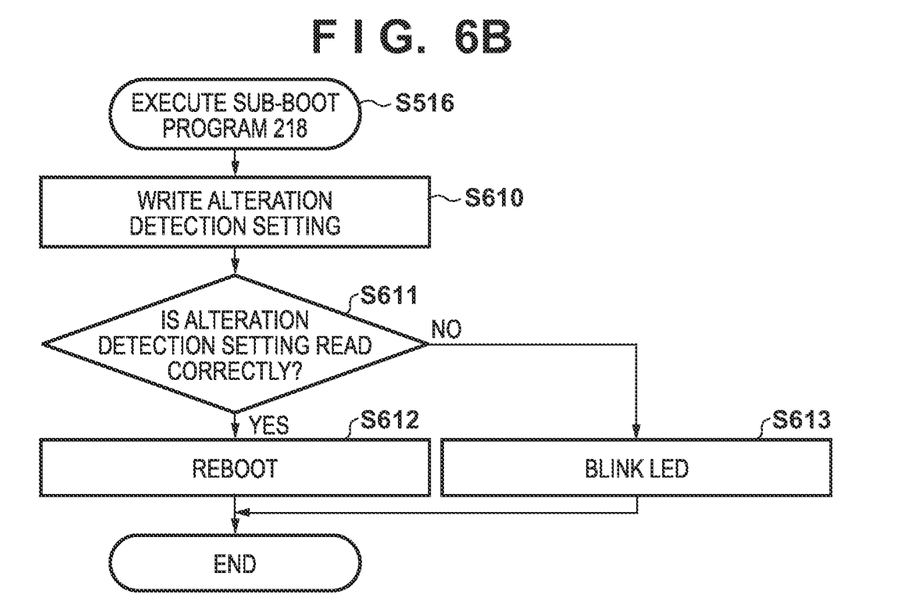
FIG. 6B is a flowchart for describing processing when a sub-boot program 218 is executed in step S516 in FIG. 5.

FIG. 6B is a flowchart for describing processing when the sub-boot program 218 is executed in step S516 in FIG. 5.

First, in step S610, the CPU 111 writes the alteration detection setting to a predetermined address of the flash memory 145. The contents of this setting are the aforementioned verification method, public key, and header pointer of the sub-boot program 218, and these have values in the sub-boot program 218. Next, the processing is advanced to step S611, the CPU 111 determines whether or not the contents written in step S610 can be read correctly. Here, if the contents can be read correctly, the processing is advanced to step S612, and if not, the processing is transitioned to step S613. In step S612, the CPU 111 reboots the system, and ends the processing of the sub-boot program 218. In the embodiment, an unshown watchdog timer is started up, and the reset controller 122 is reset after a fixed time has elapsed. The method of resetting is not limited to this. In step S613, the CPU 111 turns on the LED 147 by controlling the external port controller 137 in order to make a notification of failure in the alteration detection setting in step S611, and it ends the processing of the sub-boot program 218.

As a result of executing the sequence described above, the CPU 111 can execute the alteration detection processing and the alteration detection setting processing in an isolated manner.

Figure 7:
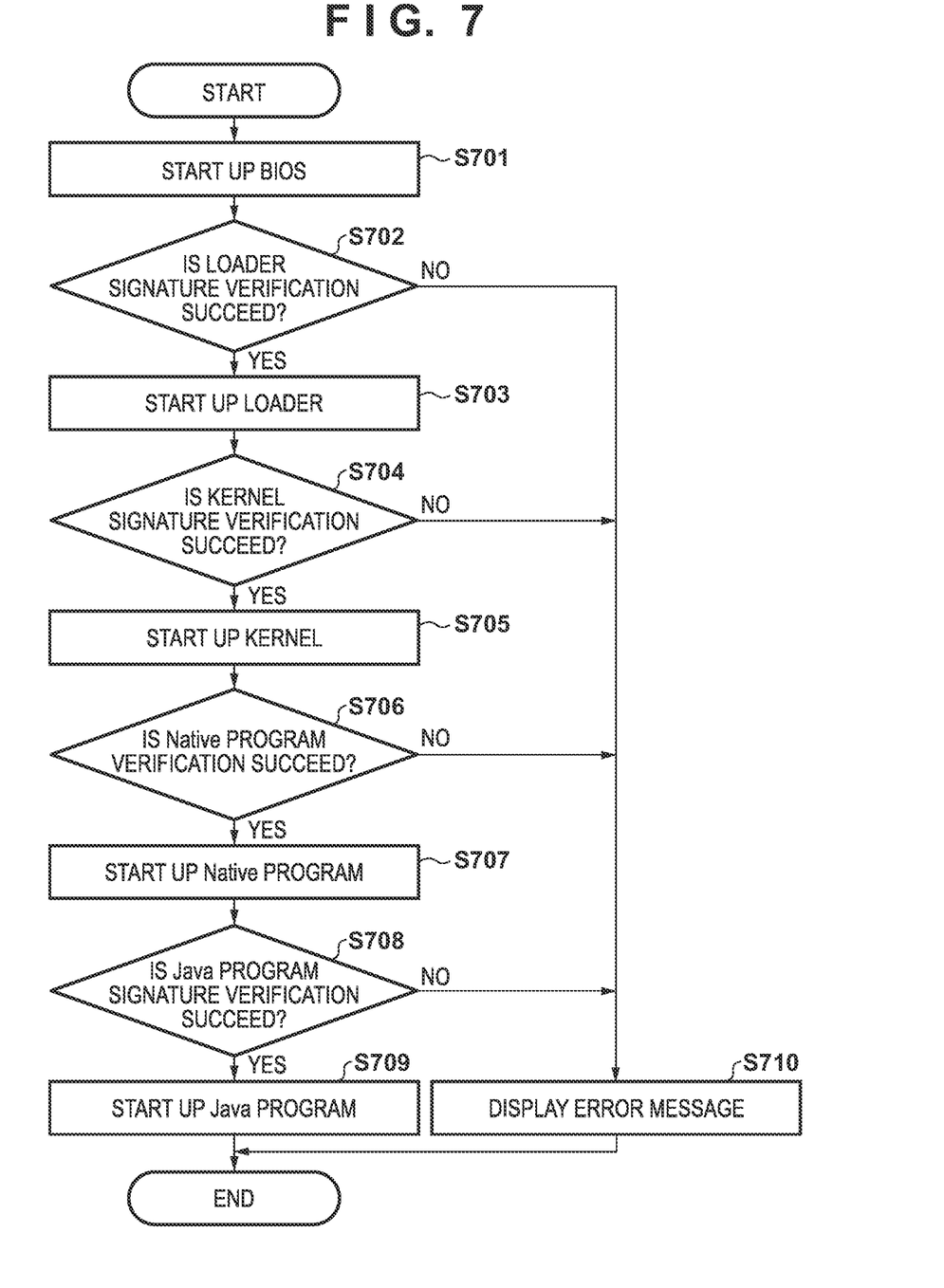
FIG. 7 is a flowchart for describing a start-up sequence of the MFP by the CPU 101 according to the embodiment.

FIG. 7 is a flowchart for describing the start-up sequence of the MFP 100 performed by the CPU 101 according to the embodiment. Note that the determination method of detection regarding whether the program (loader 211, kernel 212, Native program 213, Java program 214) has suffered from alteration in the processing described below is merely an example, and another method may be executed as long as the method is a method for detecting alteration of a program. Note that the processing shown by this flowchart can be achieved by the CPU 101 executing a program deployed in the RAM 102.

First, the CPU 101 is configured to read the reset vector 215 when the reset is released, in step S701. In the embodiment, the reset vector 215 is designed to be stored in the flash memory 145, and therefore the CPU 101 reads the reset vector 215 through the system bus 109. Then, the CPU 101 jumps to the start address of the BIOS 210 that is written in the reset vector 215, reads the BIOS 210 from the flash memory 145, and executes the BIOS 210. When the BIOS 210 is started up, various types of initialization processing are executed, and the loader alteration detection module 203 included in the BIOS 210 reads the loader 211, the kernel verification public key 305, and the loader signature 304 from the flash memory 145 to the RAM 102. The initialization sequence here includes initialization of the HDD controller 134 for allowing the access to the HDD 144, for example.

Next, the processing is advanced to step S702, the CPU 101 functions as the loader alteration detection module 203, verifies the loader signature 304 using the loader verification public key 303, and determined whether or not the signature verification is successful. Here, if it is determined that the signature verification failed, the processing proceeds to step S710, the loader alteration detection module 203 initializes the panel controller 133, displays an error message in the console unit 143 and ends this processing. On the other hand, if it is determined that the signature verification is successful, the processing proceeds to step S703, the loader alteration detection module 203 ends the processing, and the BIOS 210 stars up the loader 211 read to the RAM 102.

In this way, in step S703, the CPU 101 starts up the loader 211, and performs various types of initialization processing. The initialization here includes initialization of the panel controller 133 and displaying a start-up screen on the console unit 143, for example. Also, the kernel alteration detection module 204 included in the loader 211 reads the kernel 212, the kernel verification public key 305, and the kernel signature 306 from the flash memory 145 to the RAM 102.

Next, the processing proceeds to step S704, the CPU 101 functions as the kernel alteration detection module 204, verifies the kernel signature 306 using the kernel verification public key 305, and determines whether or not the signature verification is successful. Here, if it is determined that verification of the kernel signature failed, the processing proceeds to step S710, and the kernel alteration detection module 204 displays an error message in the console unit 143 and ends this processing. On the other hand, if it is determined that the verification of the kernel signature 306 is successful, the processing proceeds to step S705, the kernel alteration detection module 204 ends the processing, and the loader 211 starts up the kernel 212 read to the RAM 102.

In this way, when the CPU 101 has started up the kernel 212 in step S705, various types of initialization processing are performed. The initialization here includes initialization of the network interface controller 136 for enabling communication with the network 146, for example. Next, the Native program alteration detection module 205 included in the kernel 212 reads the verification public key 307 for verifying the Native program 213 and the Native program signature 308 from the flash memory 145 to the RAM 102.

Then, the processing is advanced to step S706, the CPU 101 functions as the Native program alteration detection module 205, verifies the Native program signature 308 using the verification public key 307, and determines whether or not the verification of the Native program signature 308 is successful. If it is determined that the verification of the Native program signature 308 failed, the processing proceeds to step S710, and the Native program alteration detection module 205 displays an error message in the console unit 143 and ends this processing. On the other hand, if it is determined that the verification of the Native program signature 308 is successful, the processing proceeds to step S707, and the Native program alteration detection module 205 ends the processing and starts up the Native program 213.

In step S707, the CPU 101 starts up, from the Native program 213, the Java program alteration detection module 206 that performs alteration detection processing, and it reads the Java program 214 and the Java program signature 310 from the HDD 144 to the RAM 102. Also, the CPU 101 executes a start-up program for starting up the scanner 141 and the printer 142. Moreover, the Native program 213 changes the location of the program starting up module of the CPU 111 from the ROM 112 to the RAM 113, writes the restart program to the RAM 113, resets the CPU 111, and next, restarts the CPU 111 by releasing the reset. As a result of this restart, the CPU 111 can execute the program for monitoring interruption to the external port when in the power saving mode described above.

Next, the processing is advanced to step S708, the CPU 101 functions as the Java program alteration detection module 206, verifies the Java program signature 310 using the Java program verification public key 309 written into the RAM 102 in step S705, and determines whether or not the verification of the Java program signature is successful. Here, if it is determined that the verification of the Java program signature 310 failed, the processing proceeds to step S710, and the Java program alteration detection module 206 displays an error message in the console unit 143 and ends the processing. On the other hand, if it is determined that the verification of the Java program signature 310 is successful, the Java program alteration detection module 206 ends the processing, advances the processing to step S709, and starts up the Java program 214.

Note that the processing in step S710 causes an error message to be displayed on the console unit 143, but instead of this, the LED 147 may be caused to blink by controlling the external port controller 137. Also, the display of an error message on the console unit 143 and blinking of the LED 147 may both be performed.

Note that, in the above-described embodiment, a description has been given assuming that all public keys are different, but some of these may be the same. Also, the saving locations of programs other than the boot program are not limited, and may be in another storage medium. Also, the saving locations of the programs may be different from the aforementioned locations, and a configuration may be adopted in which the loader 211 is stored in the flash memory 145 or the ROM 112, for example.

As described above, according to the embodiment, the alteration detection setting processing is necessarily executed when the alteration detection setting has not been set, and as a result, the security level can be improved.

OTHER EMBODIMENTS

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-012890, filed Jan. 29, 2020, which is hereby incorporated by reference herein in its entirety.

What is claimed is:

1. An information processing apparatus comprising:
a first CPU;
a second CPU;
a first nonvolatile memory that stores a boot program to be executed by the first CPU at a time of start-up; and
a second nonvolatile memory that stores a first boot program and a second boot program for verifying a program,
wherein the first CPU determines whether or not a verification method indicating encryption is set in the first nonvolatile memory as a setting for verifying alteration of a program, and if the verification method has not been set, executes the first boot program, and writes the setting of the verification method to the second nonvolatile memory, and
if the verification method is set, the first CPU executes the second boot program in accordance with the setting, and when the processing of the second boot program is normally ended, the second CPU starts up the information processing apparatus.

2. The information processing apparatus according to claim 1, wherein the setting includes a setting of the verification method, a public key for verifying the second boot program, and a header pointer of the second boot program.

3. The information processing apparatus according to claim 1, wherein, if the verification method is not set, the first CPU performs verification regarding the first boot program using a hash value, and if the verification is successful, executes the first boot program.

4. The information processing apparatus according to claim 2, wherein, if the verification method is set, the first CPU performs verification regarding the second boot program using the public key included in the setting, and if the verification is successful, executes the second boot program.

5. The information processing apparatus according to claim 1, wherein the second boot program performs signature verification on BIOS to be executed by the second CPU, and if the signature verification is successful, the reset of the second CPU is released, and the second CPU starts up the information processing apparatus.

6. The information processing apparatus according to claim 1, wherein the initial value of the setting for verifying alteration of a program indicates a verification method using a hash value.

7. The information processing apparatus according to claim 2, wherein, if the setting value of the public key is an initial value, the first CPU determines that a verification method indicating encryption is not set as the setting for verifying alteration of a program.

8. The information processing apparatus according to claim 1, wherein the first CPU, after writing the setting of the verification method to the second nonvolatile memory by executing the first boot program, restarts the information processing apparatus.

9. The information processing apparatus according to claim 1, wherein the first nonvolatile memory is an OTP-ROM (One Time Programmable ROM).

10. The information processing apparatus according to claim 1, wherein the second nonvolatile memory is a flash memory.

11. A start-up method of an information processing apparatus including a first CPU, a second CPU, a first nonvolatile memory that stores a boot program to be executed by the first CPU, and a second nonvolatile memory that stores a first boot program and a second boot program for verifying a program, the start-up method comprising:

the first CPU executing the boot program stored in the first nonvolatile memory by, at a time of start-up, wherein the first CPU determines whether or not a verification method indicating encryption is set in the first nonvolatile memory as a setting for verifying alteration of a program, if the verification method has not been set, the first CPU executes the first boot program, and writes the setting of the verification method to the first nonvolatile memory, when the setting of the verification method is written into the first nonvolatile memory, the first CPU restarts the information processing apparatus, if the verification method has been set, the first CPU executes the second boot program in accordance with the setting, and if the processing performed by the second boot program is normally ended, the second CPU starts up the information processing apparatus.

12. The start-up method according to claim 11, wherein if the verification method has not been set, the first CPU performs verification of the first boot program using a hash value, and if the verification is successful, executes the first boot program.

13. The start-up method according to claim 11, wherein if the verification method has been set, the first CPU performs verification of the second boot program using a public key included in the setting, and if the verification is successful, executes the second boot program.

* * * * *